United States Patent [19]
Thorndike

[11] Patent Number: 5,509,687
[45] Date of Patent: Apr. 23, 1996

[54] LANDING GEAR ASSEMBLY

[75] Inventor: Robert J. Thorndike, Oshawa, Canada

[73] Assignee: Thorsons Projects Canada, Inc., Oshawa, Canada

[21] Appl. No.: 428,617

[22] Filed: Apr. 25, 1995

Related U.S. Application Data

[63] Continuation-in-part of Ser. No. 268,939, Jun. 30, 1994, Pat. No. 5,409,251.

[51] Int. Cl.⁶ ........................................................ B60S 9/02
[52] U.S. Cl. ............................ 280/766.1; 280/763.1; 280/475; 254/419; 254/423
[58] Field of Search ......................... 280/763.1, 765.1, 280/766.1, 475, 427, 429, 431; 254/418, 419, 423, 93 HP

[56] References Cited

U.S. PATENT DOCUMENTS

| | | | |
|---|---|---|---|
| 1,149,114 | 8/1915 | Carlock, Jr. | 254/423 |
| 1,548,182 | 8/1925 | Burgin | 254/423 |
| 1,740,268 | 12/1929 | Roberts | 254/423 X |
| 1,776,939 | 9/1930 | Udelewitz | 254/423 X |
| 2,257,324 | 9/1941 | Behm et al. | 254/423 |
| 2,571,067 | 10/1951 | Seckendorf | 254/423 X |
| 2,572,410 | 10/1951 | Van Doorne | 280/763.1 |
| 2,664,073 | 12/1953 | Pine | 254/93 H X |
| 2,926,889 | 3/1960 | Obes | 254/419 |
| 3,503,588 | 3/1970 | Bach | 254/419 |
| 3,874,696 | 4/1975 | Gardner et al. | 280/475 X |
| 3,904,224 | 9/1975 | Belke | 280/475 X |
| 4,097,840 | 6/1978 | Chappelle | 280/431 |
| 4,150,840 | 4/1979 | Banerjea et al. | 280/429 |
| 4,711,464 | 12/1987 | Bilas | 280/704 |
| 4,903,977 | 2/1990 | Baxter | 280/475 |
| 5,067,746 | 11/1991 | Baker | 254/419 X |
| 5,188,379 | 2/1993 | Krause et al. | 280/6.12 |
| 5,299,829 | 4/1994 | Rivers, Jr. et al. | 280/766.1 |
| 5,340,143 | 8/1994 | Williams Jr. | 280/475 |
| 5,356,118 | 10/1994 | Schneider | 254/423 |
| 5,423,518 | 6/1995 | Baxter et al. | 254/419 |

FOREIGN PATENT DOCUMENTS

| | | | |
|---|---|---|---|
| 0195282 | 2/1986 | European Pat. Off. | |
| 0061297 | 12/1939 | Norway | 254/423 |
| 1583319 | 8/1990 | U.S.S.R. | |
| 1599252 | 10/1990 | U.S.S.R. | |

OTHER PUBLICATIONS

"Powerful Jacking with Push Button Ease!", Indianapolis Industrial Products, Inc., Indianapolis, Indiana, (undated), 1 page.

Primary Examiner—Margaret A. Focarino
Assistant Examiner—F. Zeender
Attorney, Agent, or Firm—Richard C. Litman

[57] ABSTRACT

An improved landing gear assembly made up of a pair of supports having extensible legs, each support having a generally rectangular air lift bladder encased in a box enclosure, which forces a leg downwardly when the bag is inflated, there being an internal compression spring urging the leg upwardly against the air bladder, the leg and spring being located within a generally tubular housing. Each support includes a safety latch and lock mechanism for fixing the leg with respect to the leg housing. The safety latch and lock includes an array of notches formed on the lower end of the extensible leg, a pivoting latch for engaging a selected notch, a torsion spring urging the latch into engagement with a notch, a rotatable rod linked to the pivoting latch of each support, and a handle for rotating the rod.

19 Claims, 4 Drawing Sheets

LANDING GEAR ASSEMBLY

CROSS REFERENCE TO RELATED APPLICATION

This is a continuation-in-part of Ser. No. 08/268,939, filed Jun. 30, 1994, U.S. Pat. No. 5,409,251.

BACKGROUND OF THE INVENTION

1. Field of the Invention

The present invention relates to landing gear assemblies for supporting trailers and, more particularly, to an improved air bladder actuated landing gear assembly including an airbag lift and a safety latch and lock mechanism.

2. Description of the Prior Art

Typical landing gear assemblies for semi-trailers and the like include a pivoting or vertically movable support assembly, with bottom foot pads or steel wheels, which are hand cranked into a supporting position, so as to support the semi-trailer in a level attitude when the tractor is withdrawn. More recent developments have included hydraulic or air pressure operated landing gear, either pivoted or vertically lowered into the trailer supporting position.

Prior art patents will be discussed in order of their perceived relevance to the instant invention. U.S. Pat. No. 3,904,224 issued Sep. 9, 1975, to Jack T. Belke discloses a landing gear assembly with extensible legs, each part of the assembly being attached tangentially to the trailer being supported, rather than directly therebeneath. No specific actuator is shown for moving the support legs down into a supporting position and the air bladder construction in an enlarged chamber and safety latch and lock mechanism of the instant invention are not taught by Belke.

A wheel lift construction for increasing the load capacity of a vehicle and including an air bag for extending a pair of dolly wheels, and further including a return spring assembly for retracting the wheels when the bag is deflated is seen in U.S. Pat. No. 4,711,464 issued Dec. 8, 1987, to Michael Bilas. However, this patent does not teach either the large load capacity air lift bladders and simplified extensible leg construction or the safety latch and lock mechanism of the instant invention.

A pin and hole latch mechanism for locking landing gear assembly legs in their extended position is disclosed in the Soviet Union Patent No. 1599252 dated Oct. 15, 1990, to Avtotranstekhnika, and the legs are hydraulically extended into a supporting position; the legs are pivoted about ninety degrees to a storage or stowed attitude. The safety latch and lock assembly of the instant invention is not taught in this particular patent.

Other, somewhat more remote prior art disclosures are found in the following patents. U.S. Pat. No. 3,874,696 issued Apr. 1, 1975 to Clifford C. Gardner discloses a support for semi-trailers with a pair of adjustable legs which are pivotally displaced between raised and lowered positions, there being an air cylinder to effect displacement of the legs. Another landing gear assembly but including an electric motor for raising and lowering the landing gear is seen in U.S. Pat. No. 4,097,840 issued Jun. 27, 1978, to Warner A. Chappelle; the motor is operable from the cab of the tractor through electrical circuitry. A mechanical undercarriage assembly including feet automatically retracted when the trailer is hitched and connected to a tractor is taught in U.S. Pat. No. 4,150,840, issued Apr. 24, 1979, to Tara N. Banerjea et al. The improvements of this invention are not disclosed.

U.S. Pat. No. 5,299,829 issued Apr. 5, 1994 to Bernard A. Rivers et al. teaches a pneumatic system for trailer landing gear, but the system is coupled to the conventional gear box and gear drive of such a landing assembly, rather than directly to the landing gear as in the instant invention. The following domestic and foreign patents include disclosures of related but remote landing gear assemblies: U.S. Pat. Nos. 2,572,410 issued Oct. 23, 1951, to Hubertus J. Van Doorne; 4,930,977 issued Feb. 27, 1990, to Bobby G. Baxter; 5,188,379 issued Feb. 23, 1993, to Hans H. Krause et al.; and 5,340,143 issued Aug. 23, 1994, to Thomas M. Williams, Jr.; European Patent No. 0 195 282 dated Feb. 26, 1986, to Jost-Werke GMBH; and Soviet Union Patent No. 1583319 dated Aug. 7, 1990, to N Ind Res Inst.

None of the above inventions and patents, taken either singly or in combination, is seen to describe the instant invention as claimed.

SUMMARY OF THE INVENTION

The invention is an improved landing gear assembly made up of a pair of supports having extensible legs, each support having a generally rectangular, multi-ton capacity air lift bladder encased in a box enclosure, the bladder forcing a leg downwardly when the bag is inflated, there being an internal compression spring urging the leg upwardly against the air bladder, the leg and spring being located within a generally tubular housing. Each support includes a safety latch and lock mechanism for fixing the leg with respect to the leg housing. The safety latch and lock includes an array of notches formed on the lower end of the extensible leg, a pivoting latch for engaging a selected notch, a torsion spring urging the latch into engagement with a notch, a rotatable rod linked to the pivoting latch of each support, and a handle for rotating the rod.

Accordingly, it is a principal object of the invention to provide an improved landing gear assembly for a semi-trailer having a multi-ton lift/support capacity.

It is another object of the invention to provide an improved landing gear assembly having air pressure activated support legs and an uncomplicated but fully reliable manually operable safety latch and lock mechanism.

It is a further object of the invention to provide an improved landing gear assembly employing an air bladder for extending the support legs, there being no mechanical interengagement of the leg and bladder.

Still another object of the invention is to provide a semi-trailer improved landing gear assembly with extendible legs which may be extended to different lengths to accommodate an uneven support surface or terrain and yet maintain the semi-trailer in a level attitude.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
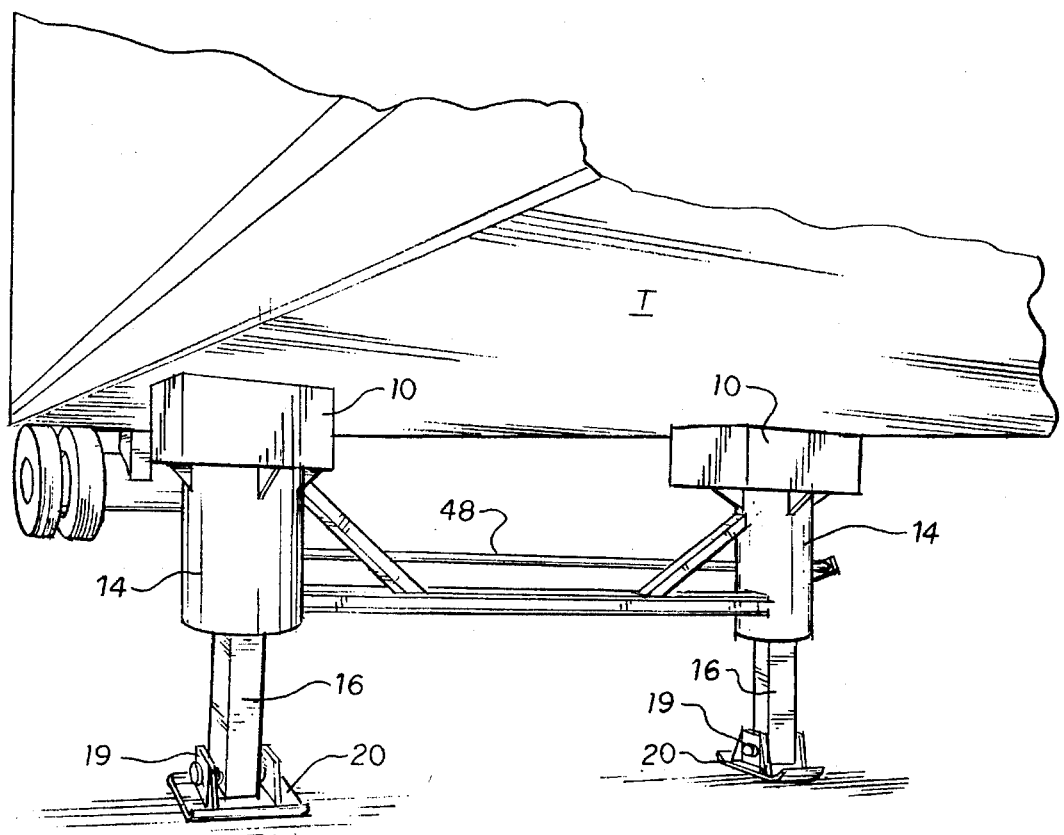
FIG. 1 is a front environmental perspective view of an improved landing gear assembly according to the present invention.
Figure 4:
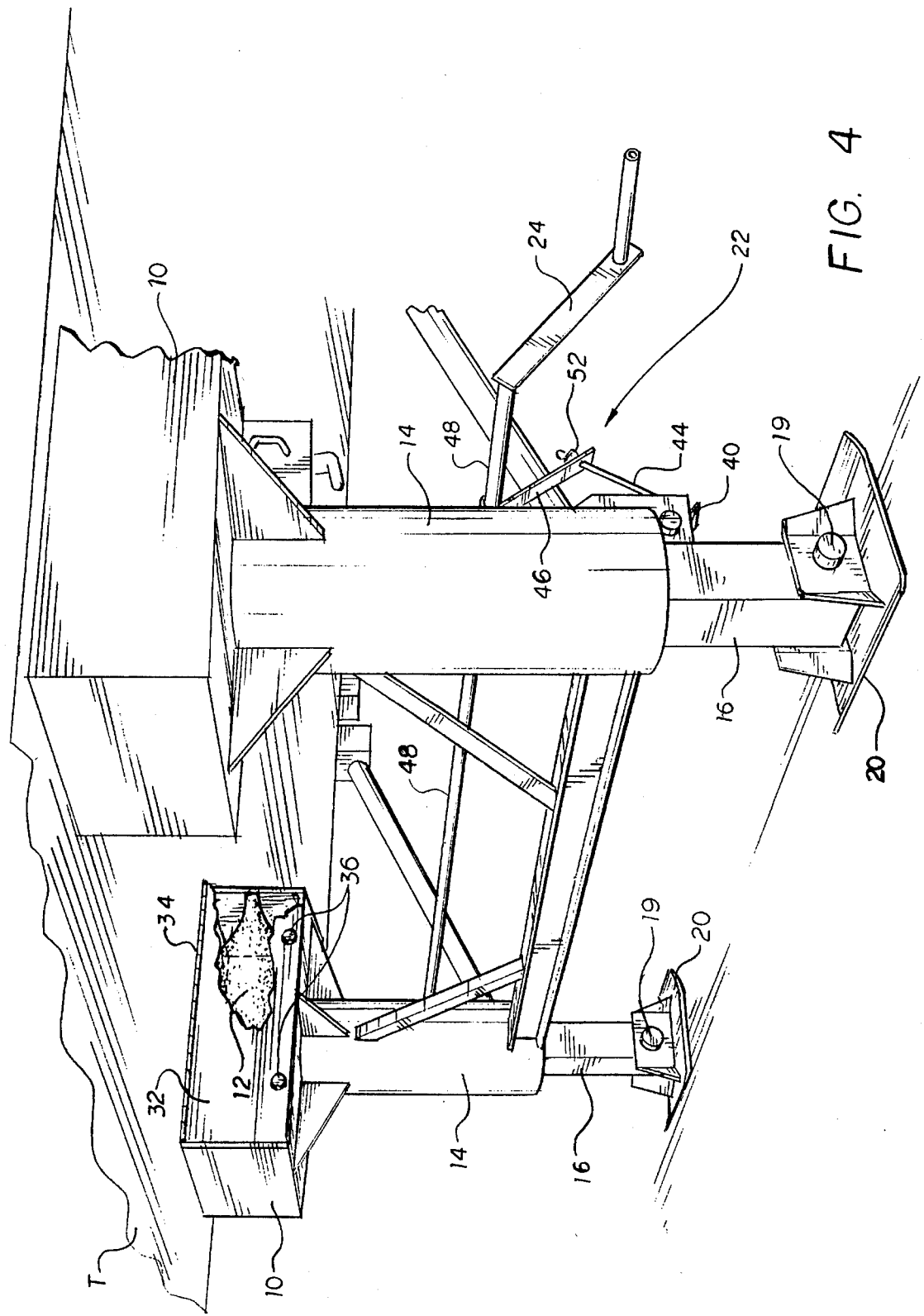
FIG. 4 is another perspective view of the invention, similar to FIG. 1, but drawn to an enlarged scale and showing further details of the invention.

The present invention as shown in FIG. 1 is an improved landing gear assembly for supporting a trailer T in the absence of a tractor, i.e., when the tractor is separated from the trailer. The landing gear assembly is made up of a pair of support units, each including an air bladder chamber 10 for an air bladder 12 (see FIG. 2), an extensible leg housing 14, an extensible support leg 16, a return, compression spring 18 (see FIG. 2) for urging the leg 16 back into its housing 14 when air pressure is released from bladder 12, and a ground engaging support foot pad 20, pivotally mounted to the lower end of leg 16 by a pin 19. A safety latch and lock mechanism 22, best seen in FIG. 4, is manually operable from a handle 24 and serves to safely latch the legs 16 in their extended positions so that continuing air pressure in bladders 12 is not required to maintain the legs 16 in the extended, trailer supporting position.

Figure 2:
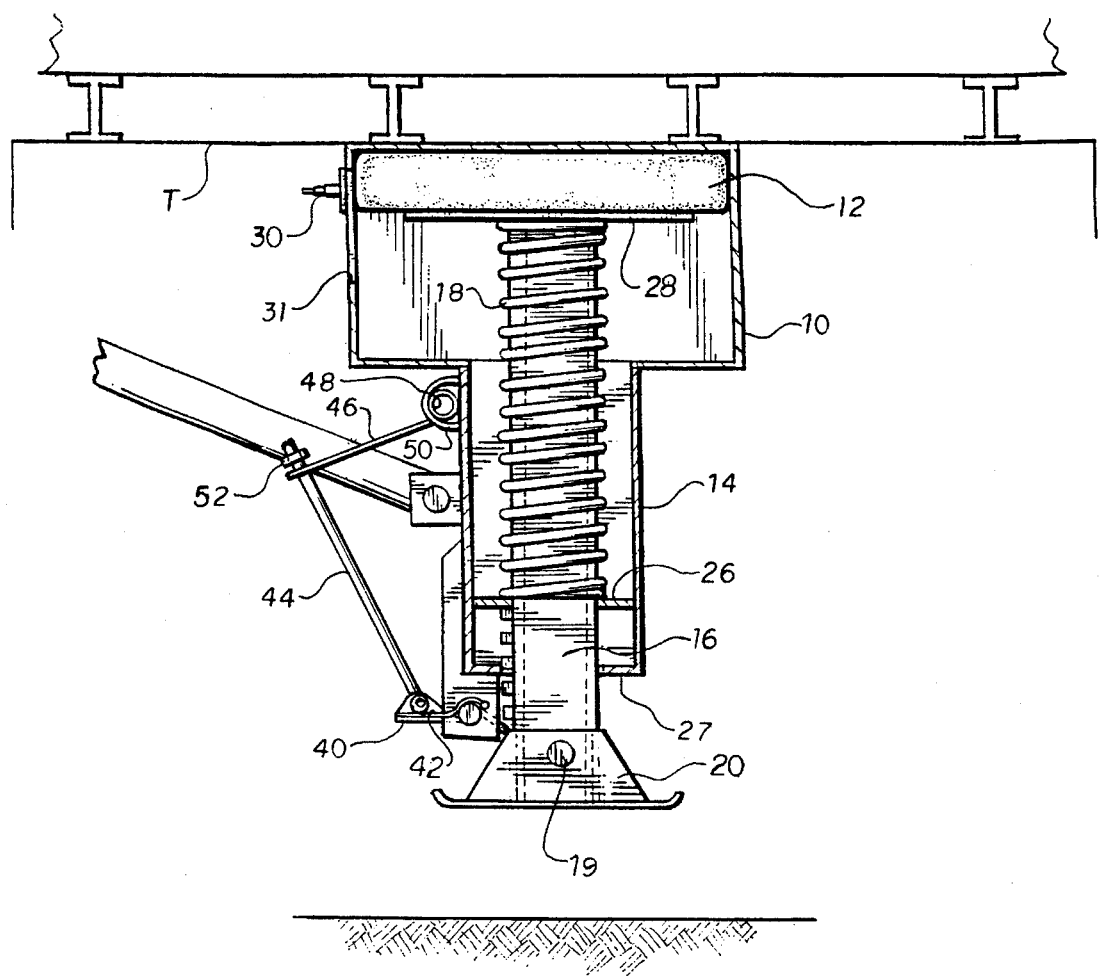
FIG. 2 is a sectional view of one unit of the landing gear assembly, showing the air bladder lift deflated and the extensible trailer support leg in a fully retracted position.

Turning now to FIG. 2, it can be seen that leg housing 14, which is tubular in construction and configuration, includes an interior leg guide and spring support plate 26, welded therewithin. The plate 26 has a square opening formed centrally therethrough for providing a guide for the leg 16, formed from square stock tubing, as the leg 16 is moved upwardly and downwardly. A second, bottom guide plate 27 is welded to the very bottom of the leg housing 14. This construction permits the leg 16 to move up and down vertically in the housing without any tilting and consequent jamming of the leg therein. As can be readily appreciated from an inspection of FIGS. 2 and 3, compression spring 18, seated firmly against plate 26, simply urges reaction plate 28, and thus leg 16, upwardly; when bladder 12 is vented, then leg 16 is forced up into a fully retracted position.

At the top of leg 16 is a pressure plate 28 which is simply a seat for air bladder 12, there being no need for any mechanical interconnection between bladder 12 and plate 28. Such construction is thus both uncomplicated yet fully functional in results.

Figure 3:
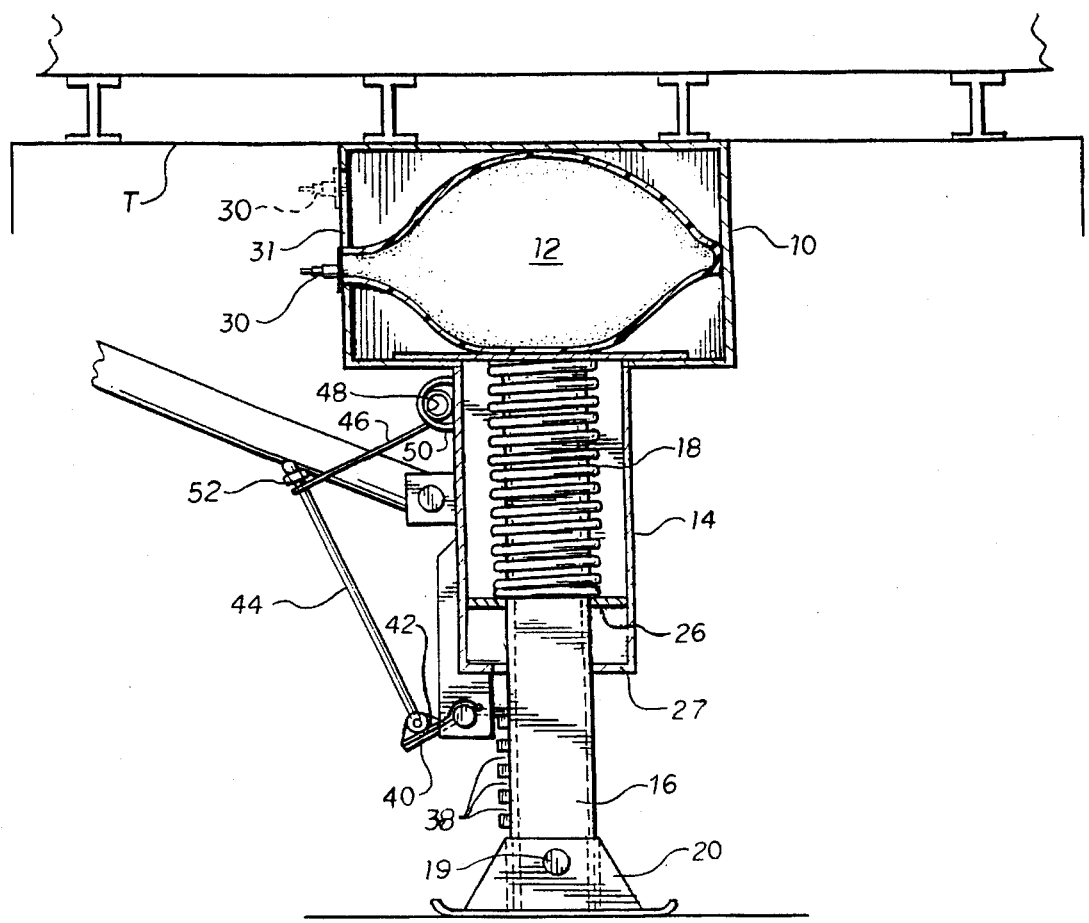
FIG. 3 is a sectional view similar to FIG. 2 but showing the air bladder fully inflated and the support leg fully extended into a trailer support position.

As for air bladder 12, it has been found that an otherwise conventional jacking bag of generally rectangular configuration, when deflated, serves the purpose of more than adequately extending the leg 16, even when the trailer T is fully loaded with a multi-ton load. A most suitable example of such an air bladder 12 is the model C.20 high pressure bladder bag sold under the brand name "Mat Jack" and manufactured by Indianapolis Industrial Products, Inc. of Indianapolis, Ind. This particular bag is about 25" by 21" by 1" thick, when deflated, and can safely and easily lift twenty tons a distance of eight inches. This bag is constructed either of five layers of butyl rubber sandwiching four layers of steel mesh or six layers of a high tensile strength, synthetic aramid fiber, or "Kevlar." This particular bladder suits the needs of the instant invention very adequately, although other brands and constructions of air bladders could be employed. The fully expanded configuration of the bladder 12 is seen in FIG. 3, the bladder 12 assuming a generally oblate spheroid configuration. Maximum expansion occurs near the center of bladder 12, easily pushing against leg pressure plate 28 and lowering the leg 16 into a supporting position, with foot pad 20 resting on the ground.

Air bladder 12 is provided with air under pressure from a suitable source (e.g., the air brake system of a tractor—not shown) through a brass fitting or port 30 vulcanized onto a corner of the air bag 12. The nipple end of the fitting 30 extends through a slot 31 formed in a side wall of chamber 10, and rides up and down therein as the bladder 12 is deflated and inflated, respectively. This construction and the just explained movement is best seen in FIGS. 2 and 3.

With reference to the upper left side of FIG. 4, an interior face of air bladder chamber 10 may be left exposed, or it may be closed by an access door 32, hinge mounted to the top of chamber 10 at 34. The door may be firmly latched closed, suitably, as by a pair of hex head bolts 36, 36, threaded through door 32 into the base of chamber 10.

Turning now to FIGS. 3 and 4, the safety latch and lock mechanism 22 will be explained in further detail. An array of ladder like, latch notches 38 are formed along the lower, exposed surface of the extensible leg 16. Conveniently, leg 16 can be fabricated from 3" square tube stock, and the notches 38 may be formed by a series of ½ by 1" by 3" bars, welded in place. A pivoting latch 40 engages a selected one of the notches 38, and is spring urged into a latch position by a torsion spring 42. In turn, each latch 40 includes a connecting rod 44 secured to a control arm 46, which is welded to a pivoting rod 48, journalled for free rotation in sleeves 50, 50, on each leg housing 14. Handle 24 is mounted on one end of rod 48. It can be appreciated that upward rotation of handle 24 causes the latches 40 to disengage, but upon manual release of handle 24, the mass of the handle 24 assures its downward movement under force of gravity, and the action of each torsion spring 42 will simply assure that each latch 40 engages a notch 38, thus assuring that the extended legs are securely locked, particularly in the absence of any air pressure within the bladders 12. Furthermore, it can be readily appreciated that each leg 16 could be extended to different distances from its associated housing 14, thus to maintain the trailer T level, even though the supporting terrain or ground surface might be rather uneven, because the two latches are independently engageable with their respective ladder like array of notches 38.

Fine adjustment of the latch mechanism may become necessary from time to time and/or because of manufacturing tolerances. Thus, an adjustment nut 52 is threaded onto the exposed upper end of each control rod 44 to provide minute adjustment so as to assure that each latch 40 firmly interengages a notch 38.

It is to be understood that the present invention is not limited to the sole embodiment described above, but encompasses any and all embodiments within the scope of the following claims.

I claim:

1. An improved landing gear-assembly including a pair of substantially identical supports, each support comprising:

a box configured chamber having generally vertical side walls and a slot defined through one of said side walls;

an air bladder located within said chamber and including a fitting for attachment to a source of compressed air, said fitting extending through said slot and riding up and down therein as said bladder is deflated and inflated, respectively;

an extensible leg having a top end and a bottom end, said top end being surmounted by a reaction plate affixed to said leg top end, said reaction plate being located beneath said air bladder;

a housing depending from said chamber, said leg being telescopically interfitted therewithin; and a spring urging said leg upwardly against the downward urging provided by said bladder when supplied with air under pressure;

said chamber having lateral dimensions greater than those of said leg housing; said chamber including a bottom, the maximum extension of said leg from said housing occurring as said reaction plate meets said chamber bottom.

2. The improved landing gear assembly according to claim 1, said air bladder being generally rectangular in configuration when deflated, said bladder further being dimensioned and configured to assume an oblate spheroidal configuration when fully inflated.

3. The improved landing gear assembly according to claim 2, said bladder being constructed of alternating layers of butyl rubber and a high tensile strength, synthetic aramid fiber.

4. The improved landing gear assembly according to claim 1, said bladder being constructed of alternating layers of butyl rubber and a high tensile strength, synthetic aramid fiber.

5. The improved landing gear assembly according to claim 1, said reaction plate and said air bladder being completely free of any mechanical interconnection therebetween.

6. The improved landing gear assembly according to claim 1, said bladder chamber including an access door pivotally attached to said chamber at the top thereof, there further being securement means for locking said access door in a closed attitude.

7. The improved landing gear assembly according to claim 1, said housing being generally cylindrical in configuration, said extensible leg being fabricated from square tubing stock, there further being a guide plate affixed internally of said housing and having a central opening defined therethrough for slidable interfit of said leg therethrough, said spring being a spiral compression spring seated on said guide plate and bearing against said reaction plate.

8. The improved landing gear assembly according to claim 1, further comprising a safety latch and lock mechanism, comprising:

means defining a linear array of latch notches along a selected, exposed, lower surface of said extensible leg;

a pivoting latch mounted onto said leg housing and pivotal about a generally horizontal axis into interengagement with a selected one of said latch notches; and manual means for moving said pivoting latch into and out of interengagement with said latch notches.

9. The improved landing gear assembly according to claim 8, wherein said means defining a linear array of latch notches comprise a plurality of spaced apart plates affixed in ladder fashion on said leg lower exposed surface.

10. The improved landing gear assembly according to claim 8, said latch including a rearwardly extended lever arm, said manual means for moving said pivoting latch including an extended length generally horizontal rod, attached to said supports for rotation about a generally horizontal axis, linkage means interconnecting said rod with each said pivoting latch, and a handle extending from one end of said rod, for rotating said rod and thus moving said pivoting latch into and out of interengagement with selected ones of said latch notches.

11. The improved landing gear assembly according to claim 10, said handle being arranged on said rod such that the mass thereof urges each latch into interengagement with selected ones of said latch notches under force of gravity.

12. The improved landing gear assembly according to claim 10, said linkage means further comprising means for adjusting the connection of said rod with each said pivoting latch.

13. The improved landing gear assembly according to claim 8, said pivoting latch including a torsion spring urging said latch into pivotal interengagement with a selected one of said latch notches.

14. An improved landing gear assembly including a pair of substantially identical supports, each support comprising:

an enclosure chamber;

an air bladder located within said chamber and including a fitting for attachment to a source of compressed air;

an extensible leg having a top end and a bottom end, said top end being surmounted by a reaction plate affixed to said leg top end, said reaction plate being located beneath said air bladder, said reaction plate and said air bladder being completely free of any mechanical interconnection therebetween;

a housing depending from said chamber, said leg being telescopically interfitted therewithin;

a spring urging said leg upwardly against the downward urging provided by said bladder when supplied with air under pressure;

said chamber having lateral dimensions greater than those of said leg housing; said chamber including a bottom, the maximum extension of said leg from said housing occurring as said reaction plate meets said chamber bottom; and a safety latch-and lock mechanism, comprising:

means defining a linear array of latch notches along a selected, exposed, lower surface of said extensible leg;

a pivoting latch mounted onto said leg housing and pivotal about a generally horizontal axis into interengagement with a selected one of said latch notches; and manual means for moving said pivoting latch into and out of interengagement with said latch notches.

15. The improved landing gear assembly according to claim 14, said bladder being constructed of alternating layers of butyl rubber and a high tensile strength, synthetic aramid fiber.

16. The improved landing gear assembly according to claim 14, said housing being generally cylindrical in configuration, said extensible leg being fabricated from square tubing stock, there further being a guide plate affixed internally of said housing and having a central opening defined therethrough for slidable interfit of said leg therethrough, said spring being a spiral compression spring seated on said guide plate and bearing against said reaction plate.

17. The improved landing gear assembly according to claim 14, said latch including a rearwardly extended lever arm, said manual means for moving said pivoting latch including an extended length generally horizontal rod, attached to said supports for rotation about a generally horizontal axis, linkage means interconnecting said rod with each said pivoting latch, and a handle extending from one end of said rod, for rotating said rod and thus moving each said pivoting latch into and out of interengagement with selected ones of said latch notches.

18. The improved landing gear assembly according to claim 17, said handle being arranged on said rod such that the mass thereof urges each latch into interengagement with selected ones of said latch notches under force of gravity.

19. The improved landing gear assembly according to claim 14, said pivoting latch including a torsion spring urging said latch into pivotal interengagement with a selected one of said latch notches.

* * * * *